Dec. 26, 1967     L. J. PRATT ET AL     3,360,313
LUBRICATING SYSTEM FOR A BEARING OF A
VERTICAL LIFT GAS TURBINE ENGINE
Filed Dec. 17, 1965
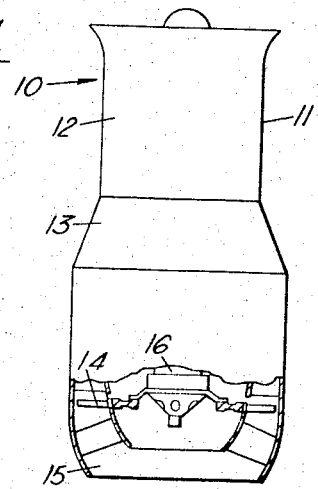
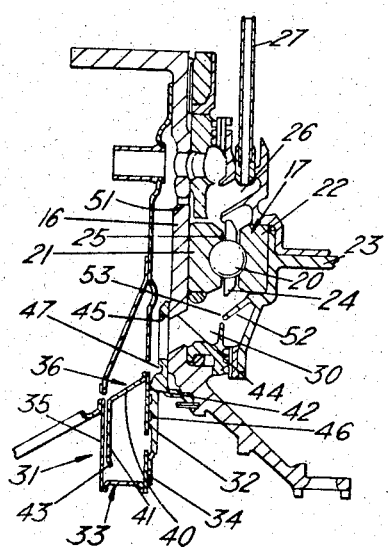
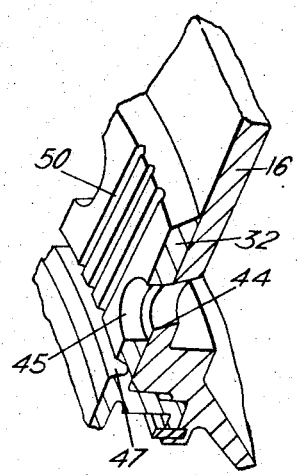
Inventors
Leslie James Pratt
Arthur George Goss
By
Cushman, Darby & Cushman
Attorneys United States Patent Office 3,360,313
Patented Dec. 26, 1967

3,360,313
LUBRICATING SYSTEM FOR A BEARING OF A VERTICAL LIFT GAS TURBINE ENGINE
Leslie James Pratt, Allenton, Derby, and Arthur G. Goss, Barrow on Trent, near Derby, England, assignors to Rolls-Royce Limited, Derby, England, a British company
Filed Dec. 17, 1965, Ser. No. 514,634
Claims priority, application Great Britain, Jan. 7, 1965, 830/65
10 Claims. (Cl. 308—187)

ABSTRACT OF THE DISCLOSURE

A lubricating system for a shaft bearing of a V.T.O.L. gas turbine jet engine having a recirculatory lubricant circuit for normal operation, and a sump chamber provided with a lubricant trap for collecting lubricant which has drained from the bearing when the shaft has stopped or when the sump chamber becomes inverted, is described. The sump chamber has a rotatable wall which has a helical groove in the internal surface thereof through which groove, when the sump chamber is upright and said wall thereof rotates, lubricant passes from the sump chamber to the bearing.

This invention concerns a lubricating system which is especially useful for a bearing of a vertical lift gas turbine engine.

According to the present invention there is provided a lubricating system for a bearing of a vertical lift gas turbine engine comprising a bearing, means for supplying lubricant to the bearing, a sump chamber, at least one drain passage through which lubricant may drain from the bearing to the sump chamber, means for returning lubricant from at least one area disposed externally of the sump chamber to the bearing, the sump chamber having a rotatably mounted wall, a lubricant trap in the upper part of the sump chamber into which will drain at least some of the lubricant in the sump chamber if the latter should become inverted, and at least one groove in the internal surface of the rotatably mounted wall, which groove, when the sump chamber is upright and rotation is effected of the rotatably mounted wall, will raise lubricant from the lower part of the sump chamber to said at least one area.

The lubricant trap preferably comprises an inverted channel member which is mounted in the upper part of the sump chamber. Thus, the inverted channel member may have one of its side walls sealed against the said rotatably mounted wall of the sump chamber, the other side wall of the inverted channel member being spaced from another wall of the sump chamber to permit lubricant which has drained from the bearing to flow therebetween and so into the bottom of the sump chamber. The said other side wall preferably extends to adjacent the bottom of the sump chamber.

There may be at least one drain passage through which lubricant may drain from the bearing to the sump chamber, and means for returning lubricant from the said area or areas to the bearing.

The said rotatably mounted wall is preferably connected to a rotatable part of the bearing. Thus, the sump chamber may be mounted internally of a vertically disposed shaft which is rotatably mounted in the bearing.

The shaft may have one or more holes therein which is or are disposed above and spaced from the upper end of the groove in the rotatably mounted wall, lubricant draining from the bearing to the sump chamber passing through said hole or holes.

The internal surface of the shaft, or of a member mounted therein, may be provided with a plurality of axially extending grooves whose lower ends communicate with the said groove in the rotatably mounted wall, the axially extending grooves by-passing the said hole or holes in the shaft and forming part of the means for returning the lubricant to the bearing.

Lubricant which has passed through the bearing may pass through a lubricant outlet space prior to passing to the sump chamber, the lubricant outlet space forming part of the said drain passage, a pump being provided for pumping lubricant from the lubricant outlet space back to the bearing.

The invention also comprises a gas turbine vertical lift engine provided with a lubricating system as set forth above. The term "vertical lift engine" as used in this specification is intended to indicate an engine adapted to produce vertical lift forces on an aircraft independently of those generated aerodynamically by forward flight of the aircraft.

The invention is illustrated, merely by way of example, in the accompanying drawings, in which:

FIGURE 1 is an elevation, partly in section, of a gas turbine vertical lift engine incorporating the present invention, FIGURE 2 is a broken away sectional view of part of the engine of FIGURE 1, and FIGURE 3 is a broken-away sectional perspective view of part of the structure shown in FIGURE 2.

Referring to the drawings, an aircraft (not shown) is provided with a vertically mounted gas turbine vertical lift engine 10, which has a thrust to weight ratio of at least 8:1 (and which may have a thrust to weight ratio of at least 16:1 or even more), comprises an engine casing 11 within which there are mounted, in flow series, a compressor 12, combustion equipment 13 and a turbine 14, the turbine exhaust gases being downwardly directed to atmosphere through a short exhaust duct 15.

The compressor 12 and turbine 14 are mounted on a common vertically disposed shaft 16 which is itself rotatably mounted in a bearing 17 (FIGURE 2).

The bearing 17 comprises balls 20 which are disposed between and in rolling contact with an inner race 21, which is mounted on the shaft 16, and an outer race 22. The outer race 22 is carried by fixed wall structure 23, the latter being secured (by means not shown) to the engine casing 11. The balls 20 are mounted in a rotatable cage 24 which is disposed between the inner race 21 and the outer race 22 and which is spaced from the inner race 21 by a gap 25.

Between the shaft 16 and the fixed wall structure 23, there is defined a lubricant inlet space 26 which may be supplied with lubricant via a lubricant inlet pipe 27 which communicates therewith. Lubricant in the lubricant inlet space 26 may pass through the gap 25 so as to effect lubrication of the balls 20, and may then drain to a lubricant outlet space or drain passage 30 which is disposed immediately beneath the bearing 17.

An annular sump chamber 31, to which the said lubricant may drain when the engine has stopped, is mounted internally of the shaft 16 and is disposed below the bearing 17. The sump chamber 31 has an outer wall 32 which is secured to and internally of the shaft 16. The wall 32 will thus rotate in unison with the shaft 16 and with the inner race 21. A channel member 33 has a side wall 34 which overlies and is secured to the bottom portion only of the wall 32, the channel member 33 having a side wall 35 which constitutes the internal wall of the annular sump chamber 31.

Mounted in the upper part of the sump chamber 31 is an inverted channel member 36. The inverted channel member 36 has a base 40 and side walls 41, 42. The side wall 42 overlies and is sealed against the upper part only of the wall 32 of the sump chamber 31. The side wall 41, which extends to adjacent the bottom of the sump chamber 31, is disposed adjacent to the wall 35 but is spaced therefrom by a gap 43.

The shaft 16 is provided with a plurality of angularly spaced apart holes 44 which communicate with the lubricant outlet space 30, the holes 44 being aligned with and communicating with a plurality of angularly spaced apart holes 45 in the wall 32. When the engine has stopped, lubricant may thus drain from the lubricant outlet space 30 so as to flow through the holes 44, 45, over the base 40, and thence through the gap 43 to the bottom of the sump chamber 31.

The inverted channel member 36 constitutes a lubricant trap into which will drain at least some of the lubricant in the sump chamber 31 if the latter should become inverted (e.g. by reason of the aircraft performing aerobatics).

The wall 32 is provided internally with a helical groove 46 whose upper end is disposed below and is spaced from the holes 44, 45, and whose lower end extends to just below the bottom of the wall 42. Accordingly, when the sump chamber 31 is upright and the shaft 16, and hence the wall 32, is rotating, lubricant will initially be centrifuged from the lower part of the sump chamber 31 and through the groove 46 to an area disposed externally of the sump chamber. Thus, opposite ends of the helical groove 46 respectively communicate with spaces disposed below and above the inverted channel member 36.

The internal surface of the wall 32, in the portion thereof which is disposed above the inverted channel member 36, is provided with a plurality of axially extending grooves 50. The lower ends of the grooves 50 communicate with an annular groove 47 which itself communicates with the upper end of the helical groove 46. The upper ends of the grooves 50, however, extend to the upper end of the wall 32 and, as will be seen from FIGURE 3, bypass the holes 44, 45. Lubricant which reaches the annular groove 47 is forced up the grooves 50 and passes therefrom up the internal surface of the shaft 16 to a plurality of angularly spaced apart drillings 51 in the shaft 16. The lubricant which has passed through the drillings 51 passes over the inner race 21 and through the gap 25, and is thus, when the engine is started up, circulated to effect lubrication of the balls 20, this circulation of lubricant taking place until the sump chamber is emptied of lubricant, after which the normal lubricant feed to the bearing will have come into operation.

A chamber 52 communicates with the lubricant outlet space 30 by a narrow gap 53. Some of the lubricant passing through the lubricant outlet space 30 will therefore pass into the chamber 52 and a pump (not shown) may be provided to pump lubricant from the chamber 52 back to the lubricant inlet pipe 27, or to the lubricant inlet space 26, or directly to the top surface of the bearing 17. The said pump may, if desired, be a venturi pump which is driven by a supply of compressed air from the downstream end of the compressor 12.

In operation, lubricant (e.g. in the form of a single shot of lubricant) is supplied to the lubricant inlet pipe 27 to effect lubrication of the bearing 17. After passing through the bearing 17, the lubricant travels through the lubricant outlet space 30, and through the holes 44, 45, and is then centrifuged up the internal surface of the shaft 16 and through the drillings 51 so as to pass over the inner race 21 and through the gap 25, the lubricant thus being recirculated to effect lubrication of the balls 20.

When the engine stops, lubricant will drain from the bearing 17 into the sump chamber 31 and on restarting the engine the lubricant from the sump chamber 31 will be circulated to effect initial lubrication of the bearing 17.

If inversion should occur of the aircraft, some of the lubricant in the sump chamber 31 will escape through the gap 43 whilst some of the lubricant will also escape through the helical groove 46, and most of this escaped lubricant will pass back to the bearing 17. Once, however, the level of the lubricant has fallen below what will, at that time, be the upper end of the wall 42, the remaining lubricant will be trapped in the inverted channel member 36. When, therefore, the aircraft returns to its normal flying attitude, there will be a considerable quantity of lubricant left in the sump chamber 31 for initial circulation to the bearing 17.

It will be understood that instead of the walls 34, 42 being separate and spaced by an annular gap, they could be constituted by a single integral wall having apertures therein.

We claim:

1. A lubricating system suitable for a bearing of a vertical lift gas turbine engine comprising a bearing, means for supplying lubricant to the bearing, a sump chamber, at least one drain passage through which lubricant may drain from the bearing to the sump chamber, means for returning lubricant from at least one area disposed externally of the sump chamber to the bearing, the sump chamber having a rotatably mounted wall, a lubricant trap in the upper part of the sump chamber into which will drain at least some of the lubricant in the sump chamber if the latter should become inverted, and at least one groove in the internal surface of the rotatably mounted wall, which groove, when the sump chamber is upright and rotation is effected of the rotatably mounted wall, will raise lubricant from the lower part of the sump chamber to said at least one area.

2. A lubricating system as claimed in claim 1 in which the lubricant trap comprises an inverted channel member which is mounted in the part of the sump chamber which uppermost when the latter is in its normal attitude.

3. A lubricating system as claimed in claim 1 in which the said groove is helical, opposite ends of the helical groove respectively communicating with spaces disposed below and above the lubricant trap.

4. A lubricating system as claimed in claim 2 in which the inverted channel member has one of its side walls sealed against the said rotatably mounted wall of the sump chamber, the other side wall of the inverted channel member being spaced from another wall of the sump chamber to permit lubricant which has drained from the bearing to flow therebetween and so into the bottom of the sump chamber.

5. A lubricating system as claimed in claim 4 in which the said other side wall extends to adjacent the bottom of the sump chamber.

6. A lubricating system as claimed in claim 1 in which the said rotatably mounted wall is connected to a rotatable part of the bearing.

7. A lubricating system as claimed in claim 6 in which the sump chamber is mounted internally of a vertically disposed shaft which is rotatably mounted in the bearing.

8. A lubricating system as claimed in claim 7 in which the shaft has at least one hole therein which is disposed above and spaced from the upper end of the groove in the rotatably mounted wall, lubricant draining from the bearing to the sump chamber passing through said hole.

9. A lubricating system as claimed in claim 8 in which the lubricant which has passed through the hole flows over the base of the inverted channel member prior to entering the sump chamber.

10. A lubricating system as claimed in claim 8 in which the internal surface of the shaft is provided with a plurality of axially extending grooves whose lower ends communicate with the said groove in the rotatably mounted wall, the axially extending grooves bypassing the said hole in the shaft and forming part of the means for returning the lubricant to the bearing.

References Cited

FOREIGN PATENTS 1,196,785   5/1959   France.

MARTIN P. SCHWADRON, *Primary Examiner.*

FRANK SUSKO, *Examiner.*